Nov. 15, 1966    S. L. BUCKAY    3,285,595
COMPACT LEAF SPRING SUSPENSION ASSEMBLY
Filed Aug. 13, 1964
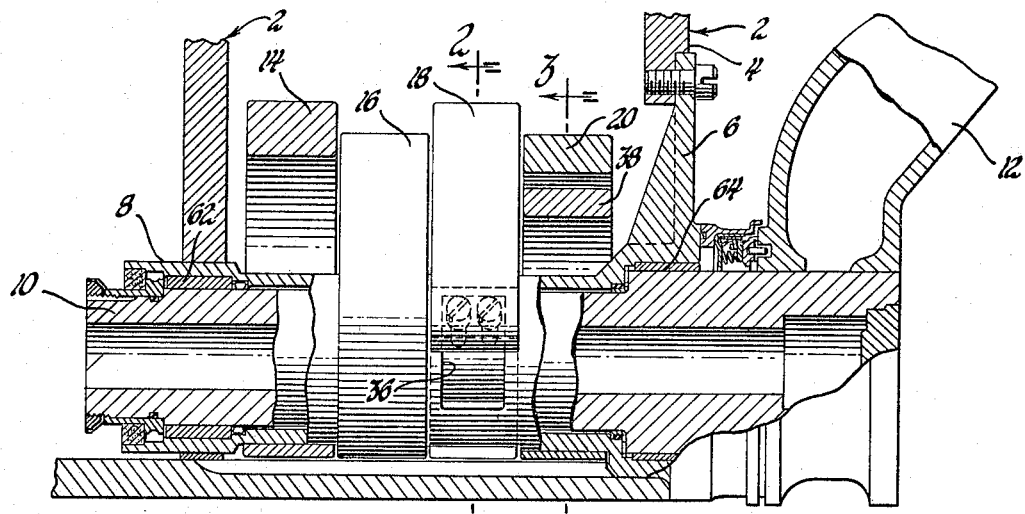
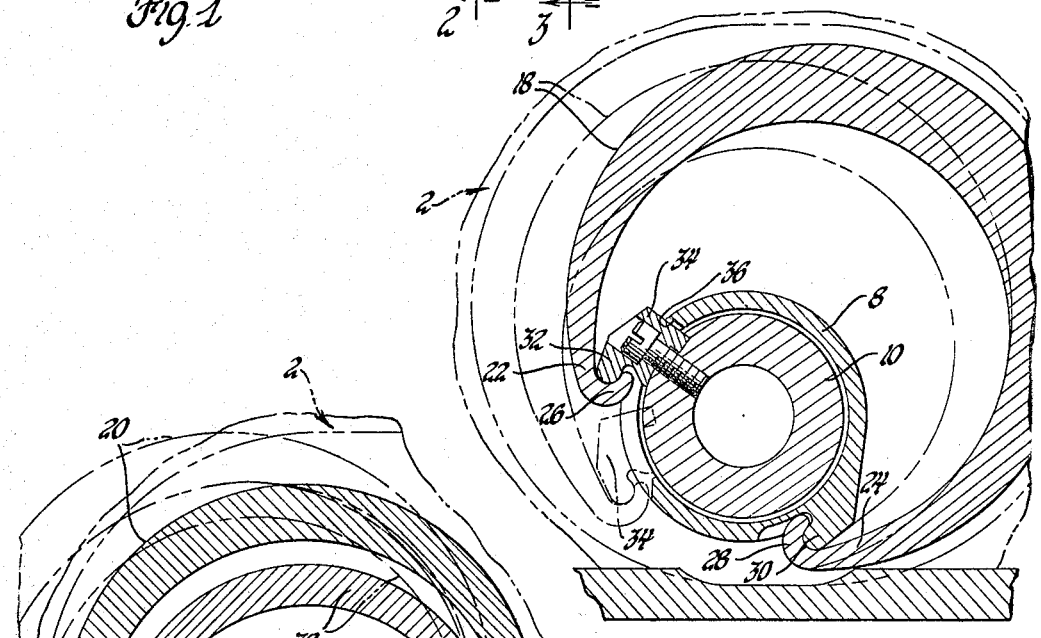
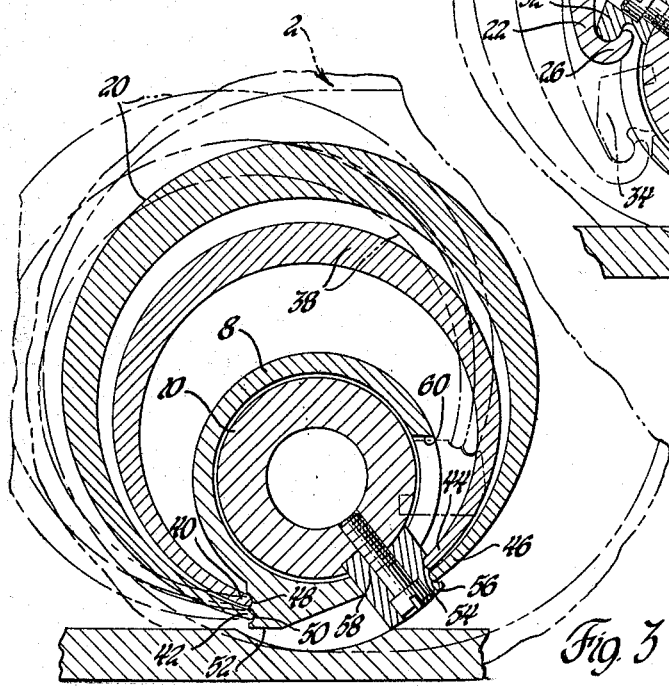
INVENTOR.
Stanley L. Buckay
BY
W. F. Wagner
ATTORNEY Nov. 15, 1966     S. L. BUCKAY     3,285,595
COMPACT LEAF SPRING SUSPENSION ASSEMBLY
Filed Aug. 13, 1964     2 Sheets-Sheet 2

INVENTOR.
Stanley L. Buckay
BY
W. F. Wagner
ATTORNEY

United States Patent Office 3,285,595
Patented Nov. 15, 1966

3,285,595
COMPACT LEAF SPRING SUSPENSION ASSEMBLY
Stanley L. Buckay, Santa Barbara, Calif., assignor to General Motors Corporation, Detroit, Mich., a corporation of Delaware
Filed Aug. 13, 1964, Ser. No. 389,368
8 Claims. (Cl. 267—19)

This invention relates to leaf spring suspension and more particularly to suspension assemblies utilizing curvilinear leaf type springs arranged in a manner enabling optimum utilization of space.

The present invention is intended to provide a compact package arrangement of the mechanical springs for use as an energy absorber in vehicle suspension assemblies of the type in which a wheel supporting arm is mounted for swinging movement about an extended pivot axis. In a typical swing arm suspension the forward end of the arm is rigidly secured to a generally horizontally extending rotary member which is appropriately journalled on the vehicle sprung mass. In this type of suspension, it has been common in the past to utilize torsion springs as the elastic medium. However, torsion bars while simple and efficient are normally relatively long. Although reduction in length of the bar to conserve space may be accomplished by re-entrant folding, this expedient is effective only to a limited degree due to the rapidly increasing stiffness of the successive outer tubular sections.

According to the general features of the invention, a suspension swing arm assembly is formed with an extended pivot shaft mounted for rotary movement on a fixed support. A plurality of curvilinear leaf springs partially surround the pivot shaft of the swing arm and operatively engage at opposite ends thereof the support and rotating member, respectively, so that upon swinging movement of the arm, a force is exerted on the spring by rotation of the shaft to induce either expansion or contraction of the springs or a combination thereof. The use of curvilinear springs of generally C-shaped configuration in combination with a rotary type suspension arm not only enables reduction in weight of spring material and the space required by permitting a wide latitude in spring cross section, but affords the additional advantage of selective modification of the load deflection characteristics by simple alteration of the angular geometry relationship of the spring actuating points and anchor pivots. The construction also lends itself ideally to utilizing the elastic characteristics of the springs for both a negative and positive deflection (wrapping and unwrapping) as well as progressive transition from negative to positive deflection.

An object of the present invention is to provide an improved suspension assembly.

A further object is to provide in a suspension assembly of the type utilizing a rotary pivot member, an arrangement of curvilinear leaf springs enabling maximum utilization of space.

Another object is to provide a suspension assembly of the general type described in which the curvilinear spring members are of C-shaped configuration and are arranged in such a way that one end thereof engages a fixed anchor or abutment, while the other end is subjected to load applied by rotation of the pivot member.

Still another object is to provide an assembly of the stated character in which the spring elements are arranged in either axial or radial stacked relation or combinations thereof.

A still further object is to provide an assembly of the type described utilizing a plurality of curvilinear springs arranged in axially stacked relation and operatively engaging a fixed support and the rotating member in such a way that load imposed by rotation of the pivot member causes alternating expansion and contraction of the successive spring elements.

These and other objects, features and advantages of the invention will become more readily apparent as reference is had to the accompanying specification and drawings wherein:

FIGURE 1 is a fragmentary plan view, partly in section, of a vehicle suspension assembly in accordance with the invention;

FIGURE 2 is an enlarged sectional view looking in the direction of arrows 2—2 of FIGURE 1;

FIGURE 3 is an enlarged sectional view looking in the direction of arrows 3—3 of FIGURE 1;

Figure 4:
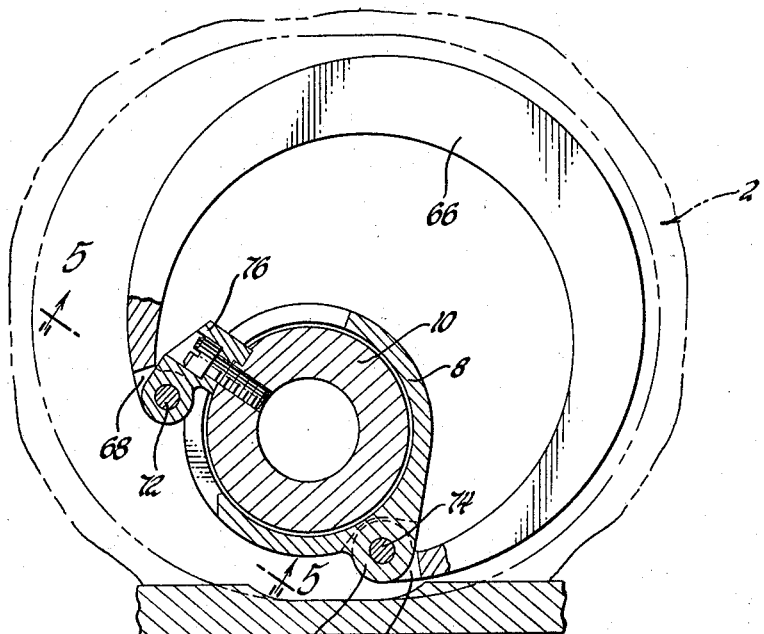
FIGURE 4 is a view similar to FIGURES 2 and 3 illustrating the modified form of spring attachment.
Figure 5:
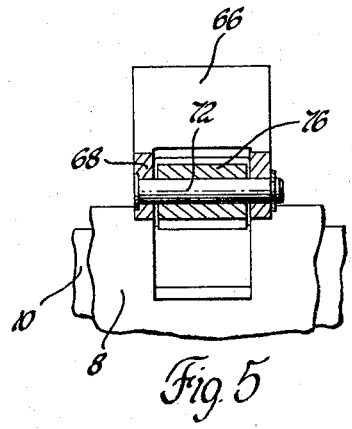
FIGURE 5 is a view looking in the direction of arrows 5—5 of FIGURE 4.

Referring now to the drawings and particularly FIGURE 1, reference numeral 2 generally illustrates a vehicle superstructure or sprung mass of a vehicle. Secured to the vertical side wall 4 of superstructure 2 is a bracket 6 which includes a transversely extending cylindrical housing 8 in which is journalled a rotatable shaft 10. Shaft 10 forms the axis of oscillation for a trailing suspension arm 12. The rearward end of trailing arm 12, not shown, is provided with a ground engaging wheel or other rotatable support member such as a bogie wheel for a track laying vehicle.

In order to provide elastic support of the superstructure 2 relative to the wheel in accordance with the invention, a plurality of axially spaced curvilinear leaf springs 14, 16, 18 and 20 are disposed in encircling relation around housing 8 and pivot shaft 10. In the embodiment shown, springs 14, 16, 18 and 20 are operatively connected to housing 8 and shaft 10 so that rotation of shaft 10 in a given direction causes springs 16 and 20 to be elastically deformed by expansion (compressive loading), while springs 14 and 18 are elastically deformed by contraction (tension loading).

As seen best in FIGURE 2, each of springs 14 and 18 are formed in a curvilinear or C-shaped configuration in which the cross-sectional dimension progressively diminishes from the center toward each of the free ends 22 and 24. At their extremities, ends 22 and 24 are provided with inturned lip portions 26 and 28. Lip portion 28 is adapted to claspingly engage a tongue anchor portion 30 extending outwardly from housing 8, while lip portion 26 engages a corresponding tongue portion 32 formed on an actuating lug 34 secured to pivot shaft 10 and extending outwardly through a slot 36 formed in housing 8. As illustrated in dash-dot lines, when shaft 10 is subjected to counterclockwise rotation by upward deflection of trailing arm 12, spring 18 is tensionally loaded by angular movement of lug 34 which reduces the linear distance between lip 26 and lip 28 and thereby causes contraction of the spring.

As seen best in FIGURE 3, spring 20 surrounds in eccentric radially spaced relation inner curvilinear spring 38. It will be understood that a similar inner spring is located within spring 16. The free ends of springs 20 and 38 are formed with abutment engaging portions 40, 42, 44 and 46 of semi-circular cross section. Portions 40 and 42 engage semicircular notches 48 and 50 formed on anchor 52 projecting outwardly from housing 8, while portions 44 and 46 engage corresponding semi-circular notches 54 and 56 formed on actuating lug 58 secured to pivot shaft 10 and extending outwardly through slot 60 formed in the housing 8. As illustrated in dash-dot lines, when shaft 10 is subjected to counterclockwise rotation causing tension loading of spring 18, as previously described, springs 20 and 38 are concurrently subjected to compressive loading by angular movement of lug 58 which increases the linear distance between the ends 40–44 and 42–46, respectively. It will, of course, be understood that utilization of two springs 20 and 38 rather than a single spring 20 is a matter of design consideration determined by the load deflection characteristics desired in the particular suspension assembly. For example, it may be desirable to eliminate spring 38 and fashion the alternating springs 14, 16, 18 and 20 so that the deflection characteristics of each are identical. In such an arrangement, it is to be noted that the assembly not only possesses the advantage of compact construction, but in addition enables balancing of radial loads on the bearings 62 and 64 for shaft 10. It is to be further noted that the load deflection curve provided by each individual spring may also be determined in part by the angular geometry relationship of the anchor members and actuating members. Thus, for example, the angular geometry of the lug 32 and anchor 30 for spring 18 provides a load deflection curve which builds up with increasing angular movement of shaft 10, while the angular geometry of the lug 58 and anchor 52 for springs 20 and 38 provides a load deflection curve which falls off with increasing angular movement of shaft 10. In this instance, the differential load deflection curves combine to provide a straight line load deflection curve for the complete assembly.

In FIGURE 4, there is shown a modified form of the invention shown in FIGURE 2, which enables utilization of the construction in applications requiring transition of spring loads from negative to positive (tension to compression). In the construction shown, the end portions of spring 66 are provided with wrapped eyes 68 and 70 which completely encircle actuating pins 72 and 74 mounted on the lug 76 and anchor 78, respectively. In this construction, it will be evident that the spring 66 may be subjected to either expansion or contraction by reversal of angular movement of lug 76 from a neutral position in which the spring would be in a relaxed condition.

Figure 6:
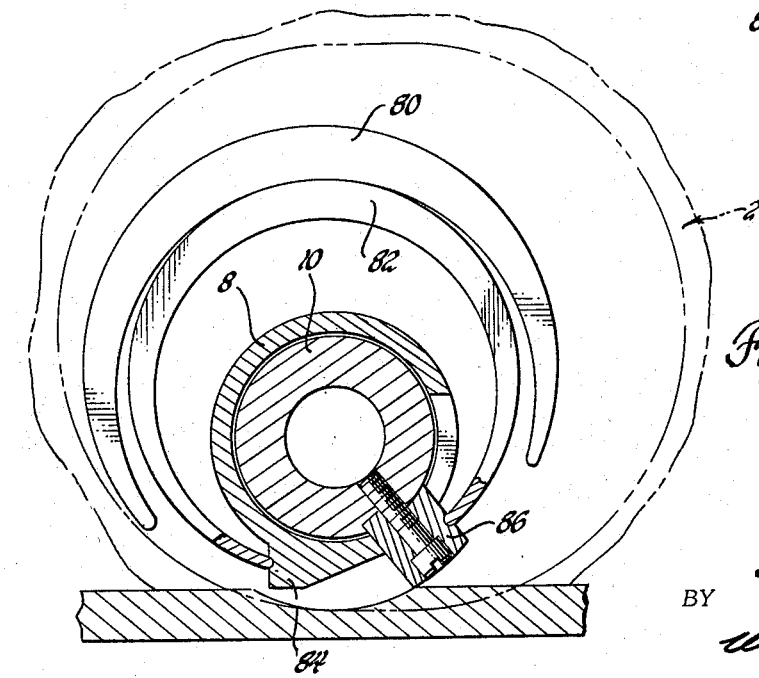
FIGURE 6 illustrates a modified form of the invention.

FIGURE 6 illustrates a further modification of the invention enabling alteration of the load deflection curve by utilizing nestingly arranged curvilinear springs which are successively engaged during the working stroke of arm 12. In this construction, the outer spring 80 is formed to loosely embrace the inner spring 82, but the free ends of the former do not directly engage either the anchor 84 or actuating lug 86. Consequently, elastic deformation of the outer spring 88 occurs only after a predetermined expansion of inner spring 82.

From the foregoing it will be seen that a novel and improved suspension arrangement has been provided. The constructions shown not only enable efficient utilization of available space, but have the additional advantage of flexibility of design in that the individual spring elements may be stacked either axially or in radially nesting relation. In the former case, maximum utilization of radially constricted elongated space is obtained, while in the latter case any number of successively larger springs may be arranged in radially nesting relation where axial space is limited.

While the invention has been depicted in connection with a trailing arm type suspension, it is to be understood that it is in no sense limited thereto, since it is equally applicable to any type of suspension assembly in which one or more arms swing about an extended pivot shaft mounted on the vehicle sprung mass. Therefore, it is to be understood that it is not intended to limit the invention to the embodiments shown, but only by the scope of the claims which follow.

I claim:

1. A spring assembly comprising, a support, a rotatable member mounted on said support, a plurality of axially spaced tapered curvilinear leaf springs encircling said member, stop means on said support engaging one end of each of said springs, and actuating means on said rotatable member operatively engaging the other end of each of said springs.

2. A compact leaf spring suspension assembly comprising, a tubular support having a radial slot formed therein, a shaft journalled for rotation within said tubular support, a curvilinear spring encircling said shaft and support, means forming eyes at each of the opposite ends of said spring, an anchor member on said support, means pivotally connecting one of said eyes with said anchor member, an actuating lug connected to said shaft and extending through said slot, and means connecting said lug to the other of said eyes whereby rotation of said shaft in one direction induces contraction deformation of said spring while rotation of said shaft in the opposite direction induces expansion deformation.

3. A spring assembly comprising, a rotatable member, a first curvilinear leaf spring encircling said member, stop means abuttingly engaging one end of said spring, actuating means on said rotatable member abuttingly engaging the other end of said spring, and a second curvilinear leaf spring surrounding said first curvilinear leaf spring, said second spring having a relaxed configuration defining an inner surface of revolution which is greater than the outer surface of revolution of said first mentioned spring.

4. The structure set forth in claim 3 wherein said second spring is formed with free end portions, the distance between which is less than the major diametric dimension of said first leaf spring.

5. A spring assembly comprising, a support, a rotatable member mounted on said support, a plurality of tapered curvilinear leaf springs encircling said member, fixed stop means on said support engaging one end of each of said springs, and actuating means on said rotatable member operatively engaging the other end of each of said springs, said support comprising a tubular element surrounding said shaft, said tubular element including a slotted portion through which said actuating means extend.

6. A compact leaf spring suspension assembly comprising, a support, a shaft journalled for rotation about a fixed axis on said support, a plurality of C-shaped leaf springs encircling said shaft, means forming anchors on said support engaging one end of said springs, and actuating lugs connected to said shaft engaging the other end of said springs, said anchors and said lugs being arranged in pairs aligned in planes normal to the axis of rotation of said shaft, and said pairs being angularly oriented so that movement of said shaft in one direction causes simultaneous alternate expansion and contraction of said springs.

7. A compact leaf spring assembly comprising, a tubular support, a shaft journalled for rotation within said tubular support, a curvilinear spring encircling said shaft and support having opposite ends formed with curved lip portions, means forming an anchor on said support interlockingly engaging one of said curved lip portions, an actuating lug on said shaft interlockingly engaging the other curved lip portion and movable in a direction causing contraction deformation of said spring, said actuating lug extending through a radial slot formed in said tubular support.

8. The structure set forth in claim 7 wherein the circumferential dimension of said slot defines the limits of angular movement of said shaft.

References Cited by the Examiner

UNITED STATES PATENTS

| | | | |
|---|---|---|---|
| 1,115,746 | 11/1914 | Stewart | 267—19 |
| 1,481,298 | 1/1924 | Macmau | 267—19 |
| 1,922,339 | 8/1933 | Woolley | 267—19 |
| 2,039,342 | 5/1936 | Pielstick | 267—1 |
| 2,109,311 | 2/1938 | Doyton | 267—19 |
| 2,825,552 | 3/1958 | Brodbury | 267—19 |

ARTHUR L. LA POINT, *Primary Examiner.*

R. M. WOHLFARTH, *Assistant Examiner.*